United States Patent
Yajima et al.

(10) Patent No.: US 7,065,488 B2
(45) Date of Patent: Jun. 20, 2006

(54) SPEECH RECOGNITION SYSTEM WITH AN ADAPTIVE ACOUSTIC MODEL

(75) Inventors: Kiyoshi Yajima, Saitama (JP); Soichi Toyama, Saitama (JP)

(73) Assignee: Pioneer Corporation, Tokyo (JP)

( * ) Notice: Subject to any disclaimer, the term of this patent is extended or adjusted under 35 U.S.C. 154(b) by 587 days.

(21) Appl. No.: 09/964,677

(22) Filed: Sep. 28, 2001

(65) Prior Publication Data

US 2002/0042712 A1    Apr. 11, 2002

(30) Foreign Application Priority Data

Sep. 29, 2000    (JP) .................... P. 2000-298536

(51) Int. Cl.
- G10L 15/28    (2006.01)
- G10L 15/20    (2006.01)
- G10L 21/02    (2006.01)

(52) U.S. Cl. .................. 704/255; 704/233; 704/226
(58) Field of Classification Search .................. None
See application file for complete search history.

(56) References Cited

U.S. PATENT DOCUMENTS

| | | | | | |
|---|---|---|---|---|---|
| 5,721,808 | A | * | 2/1998 | Minami et al. | 704/256 |
| 5,854,999 | A | * | 12/1998 | Hirayama | 704/226 |
| 5,890,113 | A | * | 3/1999 | Takagi | 704/231 |
| 5,924,065 | A | * | 7/1999 | Eberman et al. | 704/231 |
| 6,026,359 | A | * | 2/2000 | Yamaguchi et al. | 704/256.4 |
| 6,510,408 | B1 | * | 1/2003 | Hermansen | 704/233 |
| 6,529,866 | B1 | * | 3/2003 | Cope et al. | 704/205 |
| 6,658,385 | B1 | * | 12/2003 | Gong et al. | 704/244 |
| 2002/0165712 | A1 | * | 11/2002 | Souilmi et al. | 704/233 |
| 2005/0149325 | A1 | * | 7/2005 | Deng et al. | 704/226 |

FOREIGN PATENT DOCUMENTS

EP    0886 263 A2    12/1998

OTHER PUBLICATIONS

M. Shozakai et al., "A Non-Iterative Model-Adaptive E-CMN/PMC Approach for Speech Recognition in Car Environments," 5th European Conference on Speech Communication and Technology, *Eurospeech '97*, vol. 1 of 5, Sep. 22–25, 1997, pp. 287–290. (Abstract).

M. Shozakai et al., "A Non-Iterative Model-Adaptive E-CMN/PMC Approach for Speech Recognition in Car Environments," Sep. 22, 1997, pp. 287–290, XP-002203281.

M. Shozakai et al., "A Non-Iterative Model-Adpative E-CMN/PMC Approach for Speech Recognition in Car Environments," 5th European Conference on Speech Communication and Technology, *Eurospeech '97*, vol. 1 of 5, Sep. 22–25, 1997, pp. 287–290. (Abstract).

* cited by examiner

*Primary Examiner*—Wayne Young
*Assistant Examiner*—Matthew J. Sked
(74) *Attorney, Agent, or Firm*—Drinker Biddle & Reath LLP (57) ABSTRACT

At the time of the speaker adaptation, first feature vector generation sections (7, 8, 9) generate a feature vector series $[C_{i,M}]$ from which the additive noise and multiplicative noise are removed. A second feature vector generation section (12) generates a feature vector series $[S_{i,M}]$ including the features of the additive noise and multiplicative noise. A path search section (10) conducts a path search by comparing the feature vector series $[C_{i,m}]$ to the standard vector $[a_{n,m}]$ of the standard voice HMM (300). When the speaker adaptation section (11) conducts correlation operation on an average feature vector $[\hat{S}_{n,m}]$ of the standard vector $[a_{n,m}]$ corresponding to the path search result Dv and the feature vector series $[S_{i,m}]$, the adaptive vector $[x_{n,m}]$ is generated. The adaptive vector $[x_{n,m}]$ updates the feature vector of the speaker adaptive acoustic model (400) used for the speech recognition.

9 Claims, 9 Drawing Sheets

FIG. 2

| STATE NUMBER n | SYLLABLE | STANDARD VECTOR $[a_{n,M}]$ |
|---|---|---|
| 1 | A | $[\ a_{1,1}\quad a_{1,2}\quad a_{1,3}\quad \cdots\cdots\quad a_{1,M}\ ]$ |
| 2 | I | $[\ a_{2,1}\quad a_{2,2}\quad a_{2,3}\quad \cdots\cdots\quad a_{2,M}\ ]$ |
| 3 | U | $[\ a_{3,1}\quad a_{3,2}\quad a_{3,3}\quad \cdots\cdots\quad a_{3,M}\ ]$ |
| 4 | E | $[\ a_{4,1}\quad a_{4,2}\quad a_{4,3}\quad \cdots\cdots\quad a_{4,M}\ ]$ |
| 5 | O | $[\ a_{5,1}\quad a_{5,2}\quad a_{5,3}\quad \cdots\cdots\quad a_{5,M}\ ]$ |
| 6 | KA | $[\ a_{6,1}\quad a_{6,2}\quad a_{6,3}\quad \cdots\cdots\quad a_{6,M}\ ]$ |
| ⋮ | ⋮ | ⋮ |
| 10 | KO | $[\ a_{10,1}\quad a_{10,2}\quad a_{10,3}\quad \cdots\cdots\quad a_{10,M}\ ]$ |
| 11 | SA | $[\ a_{11,1}\quad a_{11,2}\quad a_{11,3}\quad \cdots\cdots\quad a_{11,M}\ ]$ |
| ⋮ | ⋮ | ⋮ |
| 16 | TA | $[\ a_{16,1}\quad a_{16,2}\quad a_{16,3}\quad \cdots\cdots\quad a_{16,M}\ ]$ |
| 17 | TI | $[\ a_{17,1}\quad a_{17,2}\quad a_{17,3}\quad \cdots\cdots\quad a_{17,M}\ ]$ |
| ⋮ | ⋮ | ⋮ |
| 21 | NA | $[\ a_{21,1}\quad a_{21,2}\quad a_{21,3}\quad \cdots\cdots\quad a_{21,M}\ ]$ |
| 22 | NI | $[\ a_{22,1}\quad a_{22,2}\quad a_{22,3}\quad \cdots\cdots\quad a_{22,M}\ ]$ |
| ⋮ | ⋮ | ⋮ |
| 26 | HA | $[\ a_{26,1}\quad a_{26,2}\quad a_{26,3}\quad \cdots\cdots\quad a_{26,M}\ ]$ |
| ⋮ | ⋮ | ⋮ |
| 31 | MA | $[\ a_{31,1}\quad a_{31,2}\quad a_{31,3}\quad \cdots\cdots\quad a_{31,M}\ ]$ |
| ⋮ | ⋮ | ⋮ |
| 36 | YA | $[\ a_{36,1}\quad a_{36,2}\quad a_{36,3}\quad \cdots\cdots\quad a_{36,M}\ ]$ |
| 37 | YU | $[\ a_{37,1}\quad a_{37,2}\quad a_{37,3}\quad \cdots\cdots\quad a_{37,M}\ ]$ |
| 38 | YO | $[\ a_{38,1}\quad a_{38,2}\quad a_{38,3}\quad \cdots\cdots\quad a_{38,M}\ ]$ |
| 39 | RA | $[\ a_{39,1}\quad a_{39,2}\quad a_{39,3}\quad \cdots\cdots\quad a_{39,M}\ ]$ |
| ⋮ | ⋮ | ⋮ |
| 44 | WA | $[\ a_{44,1}\quad a_{44,2}\quad a_{44,3}\quad \cdots\cdots\quad a_{44,M}\ ]$ |
| 45 | WO | $[\ a_{45,1}\quad a_{45,2}\quad a_{45,3}\quad \cdots\cdots\quad a_{45,M}\ ]$ |
| 46 | N | $[\ a_{46,1}\quad a_{46,2}\quad a_{46,3}\quad \cdots\cdots\quad a_{46,M}\ ]$ |
| ⋮ | ⋮ | |
| N | ⋮ | $[\ a_{N,1}\quad a_{N,2}\quad a_{N,3}\quad \cdots\cdots\quad a_{N,M}\ ]$ |

FIG. 3

TIME ↓

| FRAME NUMBER i | AT THE TIME OF SPEAKER ADAPTATION, FEATURE VECTOR [$s_{i,M}$] GENERATED IN THE FEATURE VECTOR GENERATION SECTION 12 | | | | |
|---|---|---|---|---|---|
| 1 | [ $S_{1,1}$ | $S_{1,2}$ | $S_{1,3}$ | ...... | $S_{1,M}$ ] |
| 2 | [ $S_{2,1}$ | $S_{2,2}$ | $S_{2,3}$ | ...... | $S_{2,M}$ ] |
| 3 | [ $S_{3,1}$ | $S_{3,2}$ | $S_{3,3}$ | ...... | $S_{3,M}$ ] |
| 4 | [ $S_{4,1}$ | $S_{4,2}$ | $S_{4,3}$ | ...... | $S_{4,M}$ ] |
| 5 | [ $S_{5,1}$ | $S_{5,2}$ | $S_{5,3}$ | ...... | $S_{5,M}$ ] |
| 6 | [ $S_{6,1}$ | $S_{6,2}$ | $S_{6,3}$ | ...... | $S_{6,M}$ ] |
| 7 | [ $S_{7,1}$ | $S_{7,2}$ | $S_{7,3}$ | ...... | $S_{7,M}$ ] |
| 8 | [ $S_{8,1}$ | $S_{8,2}$ | $S_{8,3}$ | ...... | $S_{8,M}$ ] |
| 9 | [ $S_{9,1}$ | $S_{9,2}$ | $S_{9,3}$ | ...... | $S_{9,M}$ ] |
| 10 | [ $S_{10,1}$ | $S_{10,2}$ | $S_{10,3}$ | ...... | $S_{10,M}$ ] |
| 11 | [ $S_{11,1}$ | $S_{11,2}$ | $S_{11,3}$ | ...... | $S_{11,M}$ ] |
| 12 | [ $S_{12,1}$ | $S_{12,2}$ | $S_{12,3}$ | ...... | $S_{12,M}$ ] |
| 13 | [ $S_{13,1}$ | $S_{13,2}$ | $S_{13,3}$ | ...... | $S_{13,M}$ ] |
| 14 | [ $S_{14,1}$ | $S_{14,2}$ | $S_{14,3}$ | ...... | $S_{14,M}$ ] |
| 15 | [ $S_{15,1}$ | $S_{15,2}$ | $S_{15,3}$ | ...... | $S_{15,M}$ ] |
| 16 | [ $S_{16,1}$ | $S_{16,2}$ | $S_{16,3}$ | ...... | $S_{16,M}$ ] |
| 17 | [ $S_{17,1}$ | $S_{17,2}$ | $S_{17,3}$ | ...... | $S_{17,M}$ ] |
| 18 | [ $S_{18,1}$ | $S_{18,2}$ | $S_{18,3}$ | ...... | $S_{18,M}$ ] |
| 19 | [ $S_{19,1}$ | $S_{19,2}$ | $S_{19,3}$ | ...... | $S_{19,M}$ ] |
| 20 | [ $S_{20,1}$ | $S_{20,2}$ | $S_{20,3}$ | ...... | $S_{20,M}$ ] |
| ⋮ | ⋮ | | ⋮ | | |
| 29 | [ $S_{29,1}$ | $S_{29,2}$ | $S_{29,3}$ | ...... | $S_{29,M}$ ] |
| 30 | [ $S_{30,1}$ | $S_{30,2}$ | $S_{30,3}$ | ...... | $S_{30,M}$ ] |

FIG. 4

TIME ↓

| FRAME NUMBER i | AT THE TIME OF SPEAKER ADAPTATION, FEATURE VECTOR [$c_{i,M}$] OUTPUTTED FROM MULTIPLICATIVE NOISE REMOVAL SECTION 9 |
|---|---|
| 1 | [ $c_{1,1}$   $c_{1,2}$   $c_{1,3}$   ……   $c_{1,M}$ ] |
| 2 | [ $c_{2,1}$   $c_{2,2}$   $c_{2,3}$   ……   $c_{2,M}$ ] |
| 3 | [ $c_{3,1}$   $c_{3,2}$   $c_{3,3}$   ……   $c_{3,M}$ ] |
| 4 | [ $c_{4,1}$   $c_{4,2}$   $c_{4,3}$   ……   $c_{4,M}$ ] |
| 5 | [ $c_{5,1}$   $c_{5,2}$   $c_{5,3}$   ……   $c_{5,M}$ ] |
| 6 | [ $c_{6,1}$   $c_{6,2}$   $c_{6,3}$   ……   $c_{6,M}$ ] |
| 7 | [ $c_{7,1}$   $c_{7,2}$   $c_{7,3}$   ……   $c_{7,M}$ ] |
| 8 | [ $c_{8,1}$   $c_{8,2}$   $c_{8,3}$   ……   $c_{8,M}$ ] |
| 9 | [ $c_{9,1}$   $c_{9,2}$   $c_{9,3}$   ……   $c_{9,M}$ ] |
| 10 | [ $c_{10,1}$   $c_{10,2}$   $c_{10,3}$   ……   $c_{10,M}$ ] |
| 11 | [ $c_{11,1}$   $c_{11,2}$   $c_{11,3}$   ……   $c_{11,M}$ ] |
| 12 | [ $c_{12,1}$   $c_{12,2}$   $c_{12,3}$   ……   $c_{12,M}$ ] |
| 13 | [ $c_{13,1}$   $c_{13,2}$   $c_{13,3}$   ……   $c_{13,M}$ ] |
| 14 | [ $c_{14,1}$   $c_{14,2}$   $c_{14,3}$   ……   $c_{14,M}$ ] |
| 15 | [ $c_{15,1}$   $c_{15,2}$   $c_{15,3}$   ……   $c_{15,M}$ ] |
| 16 | [ $c_{16,1}$   $c_{16,2}$   $c_{16,3}$   ……   $c_{16,M}$ ] |
| 17 | [ $c_{17,1}$   $c_{17,2}$   $c_{17,3}$   ……   $c_{17,M}$ ] |
| 18 | [ $c_{18,1}$   $c_{18,2}$   $c_{18,3}$   ……   $c_{18,M}$ ] |
| 19 | [ $c_{19,1}$   $c_{19,2}$   $c_{19,3}$   ……   $c_{19,M}$ ] |
| 20 | [ $c_{20,1}$   $c_{20,2}$   $c_{20,3}$   ……   $c_{20,M}$ ] |
| ⋮ | ⋮ |
| 29 | [ $c_{29,1}$   $c_{29,2}$   $c_{29,3}$   ……   $c_{29,M}$ ] |
| 30 | [ $c_{30,1}$   $c_{30,2}$   $c_{30,3}$   ……   $c_{30,M}$ ] |

FIG. 5

TIME ↓

| FRAME NUMBER i | STATE NUMBER n | |
|---|---|---|
| 1 | 10 | ⎫ |
| 2 | 10 | |
| 3 | 10 | [KO] |
| 4 | 10 | |
| 5 | 10 | |
| 6 | 10 | ⎭ |
| 7 | 46 | ⎫ |
| 8 | 46 | [N] |
| 9 | 46 | |
| 10 | 46 | ⎭ |
| 11 | 22 | ⎫ |
| 12 | 22 | [N1] |
| 13 | 22 | |
| 14 | 22 | ⎭ |
| 15 | 17 | ⎫ |
| 16 | 17 | [T1] |
| 17 | 17 | |
| 18 | 17 | ⎭ |
| 19 | 44 | ⎫ |
| 20 | 44 | |
| ⋮ | ⋮ | [WA] |
| 29 | 44 | |
| 30 | 44 | ⎭ |

FIG. 6

| FRAME NUMBER i | FEATURE VECTOR [ Si,M ] | STATE NUMBER n | STANDARD VECTOR [ an,M ] | |
|---|---|---|---|---|
| 1 | [ S1,1 ...... S1,M ] | 10 | [ a10,1 ...... a10,M ] | [KO] |
| 2 | [ S2,1 ...... S2,M ] | 10 | [ a10,1 ...... a10,M ] | |
| 3 | [ S3,1 ...... S3,M ] | 10 | [ a10,1 ...... a10,M ] | |
| 4 | [ S4,1 ...... S4,M ] | 10 | [ a10,1 ...... a10,M ] | |
| 5 | [ S5,1 ...... S5,M ] | 10 | [ a10,1 ...... a10,M ] | |
| 6 | [ S6,1 ...... S6,M ] | 10 | [ a10,1 ...... a10,M ] | |
| 7 | [ S7,1 ...... S7,M ] | 46 | [ a46,1 ...... a46,M ] | [N] |
| 8 | [ S8,1 ...... S8,M ] | 46 | [ a46,1 ...... a46,M ] | |
| 9 | [ S9,1 ...... S9,M ] | 46 | [ a46,1 ...... a46,M ] | |
| 10 | [ S10,1 ...... S10,M ] | 46 | [ a46,1 ...... a46,M ] | |
| 11 | [ S11,1 ...... S11,M ] | 22 | [ a22,1 ...... a22,M ] | [NI] |
| 12 | [ S12,1 ...... S12,M ] | 22 | [ a22,1 ...... a22,M ] | |
| 13 | [ S13,1 ...... S13,M ] | 22 | [ a22,1 ...... a22,M ] | |
| 14 | [ S14,1 ...... S14,M ] | 22 | [ a22,1 ...... a22,M ] | |
| 15 | [ S15,1 ...... S15,M ] | 17 | [ a17,1 ...... a17,M ] | [TI] |
| 16 | [ S16,1 ...... S16,M ] | 17 | [ a17,1 ...... a17,M ] | |
| 17 | [ S17,1 ...... S17,M ] | 17 | [ a17,1 ...... a17,M ] | |
| 18 | [ S18,1 ...... S18,M ] | 17 | [ a17,1 ...... a17,M ] | |
| 19 | [ S19,1 ...... S19,M ] | 44 | [ a44,1 ...... a44,M ] | [WA] |
| 20 | [ S20,1 ...... S20,M ] | 44 | [ a44,1 ...... a44,M ] | |
| ⋮ | ⋮ | ⋮ | ⋮ | |
| 29 | [ S29,1 ...... S29,M ] | 44 | [ a44,1 ...... a44,M ] | |
| 30 | [ S30,1 ...... S30,M ] | 44 | [ a44,1 ...... a44,M ] | |

FIG. 7

| | AVERAGE FEATURE VECTOR [$s_{n,M}$] | STATE NUMBER n | STANDARD VECTOR [$a_{n,M}$] | |
|---|---|---|---|---|
| AVERAGE OF i = 1~6 | [$s_{10,1}$ ······ $s_{10,M}$] | 10 | [$a_{10,1}$ ······ $a_{10,M}$] | ← [KO] |
| AVERAGE OF i = 7~10 | [$s_{46,1}$ ······ $s_{46,M}$] | 46 | [$a_{46,1}$ ······ $a_{46,M}$] | ← [N] |
| AVERAGE OF i = 11~14 | [$s_{22,1}$ ······ $s_{22,M}$] | 22 | [$a_{22,1}$ ······ $a_{22,M}$] | ← [NI] |
| AVERAGE OF i = 15~18 | [$s_{17,1}$ ······ $s_{17,M}$] | 17 | [$a_{17,1}$ ······ $a_{17,M}$] | ← [TI] |
| AVERAGE OF i = 19~30 | [$s_{44,1}$ ······ $s_{44,M}$] | 44 | [$a_{44,1}$ ······ $a_{44,M}$] | ← [WA] |

FIG. 8

| STATE NUMBER n | SYLLABLE | ADAPTIVR VECTOR OF ACCOUSTIC HMM AFTER UPDATED | | | | |
|---|---|---|---|---|---|---|
| 1 | A | [ $X_{1,1}$ | $X_{1,2}$ | $X_{1,3}$ | ...... | $X_{1,M}$ ] |
| 2 | I | [ $X_{2,1}$ | $X_{2,2}$ | $X_{2,3}$ | ...... | $X_{2,M}$ ] |
| 3 | U | [ $X_{3,1}$ | $X_{3,2}$ | $X_{3,3}$ | ...... | $X_{3,M}$ ] |
| 4 | E | [ $X_{4,1}$ | $X_{4,2}$ | $X_{4,3}$ | ...... | $X_{4,M}$ ] |
| 5 | O | [ $X_{5,1}$ | $X_{5,2}$ | $X_{5,3}$ | ...... | $X_{5,M}$ ] |
| 6 | KA | [ $X_{6,1}$ | $X_{6,2}$ | $X_{6,3}$ | ...... | $X_{6,M}$ ] |
| ⋮ | ⋮ | | | | | |
| 10 | KO | [ $X_{10,1}$ | $X_{10,2}$ | $X_{10,3}$ | ...... | $X_{10,M}$ ] |
| 11 | SA | [ $X_{11,1}$ | $X_{11,2}$ | $X_{11,3}$ | ...... | $X_{11,M}$ ] |
| ⋮ | ⋮ | | | | | |
| 16 | TA | [ $X_{16,1}$ | $X_{16,2}$ | $X_{16,3}$ | ...... | $X_{16,M}$ ] |
| 17 | TI | [ $X_{17,1}$ | $X_{17,2}$ | $X_{17,3}$ | ...... | $X_{17,M}$ ] |
| ⋮ | ⋮ | | | | | |
| 21 | NA | [ $X_{21,1}$ | $X_{21,2}$ | $X_{21,3}$ | ...... | $X_{21,M}$ ] |
| 22 | NI | [ $X_{22,1}$ | $X_{22,2}$ | $X_{22,3}$ | ...... | $X_{22,M}$ ] |
| ⋮ | ⋮ | | | | | |
| 26 | HA | [ $X_{26,1}$ | $X_{26,2}$ | $X_{26,3}$ | ...... | $X_{26,M}$ ] |
| ⋮ | ⋮ | | | | | |
| 31 | MA | [ $X_{31,1}$ | $X_{31,2}$ | $X_{31,3}$ | ...... | $X_{31,M}$ ] |
| ⋮ | ⋮ | | | | | |
| 36 | YA | [ $X_{36,1}$ | $X_{36,2}$ | $X_{36,3}$ | ...... | $X_{36,M}$ ] |
| 37 | YU | [ $X_{37,1}$ | $X_{37,2}$ | $X_{37,3}$ | ...... | $X_{37,M}$ ] |
| 38 | YO | [ $X_{38,1}$ | $X_{38,2}$ | $X_{38,3}$ | ...... | $X_{38,M}$ ] |
| 39 | RA | [ $X_{39,1}$ | $X_{39,2}$ | $X_{39,3}$ | ...... | $X_{39,M}$ ] |
| ⋮ | ⋮ | | | | | |
| 44 | WA | [ $X_{44,1}$ | $X_{44,2}$ | $X_{44,3}$ | ...... | $X_{44,M}$ ] |
| 45 | WO | [ $X_{45,1}$ | $X_{45,2}$ | $X_{45,3}$ | ...... | $X_{45,M}$ ] |
| 46 | N | [ $X_{46,1}$ | $X_{46,2}$ | $X_{46,3}$ | ...... | $X_{46,M}$ ] |
| ⋮ | ⋮ | | | | | |
| N | ⋮ | [ $X_{N,1}$ | $X_{N,2}$ | $X_{N,3}$ | ...... | $X_{N,M}$ ] |

RELATED ART
FIG. 9

SPEECH RECOGNITION SYSTEM WITH AN ADAPTIVE ACOUSTIC MODEL

BACKGROUND OF THE INVENTION

1. Field of the Invention

The present invention relates to a speech recognition system, and specially relates to the speaker adaptive type speech recognition system which is robust to the noise. As used through-out the specification, voice recognition means speech recognition.

2. Description of the Related Art

Figure 9:
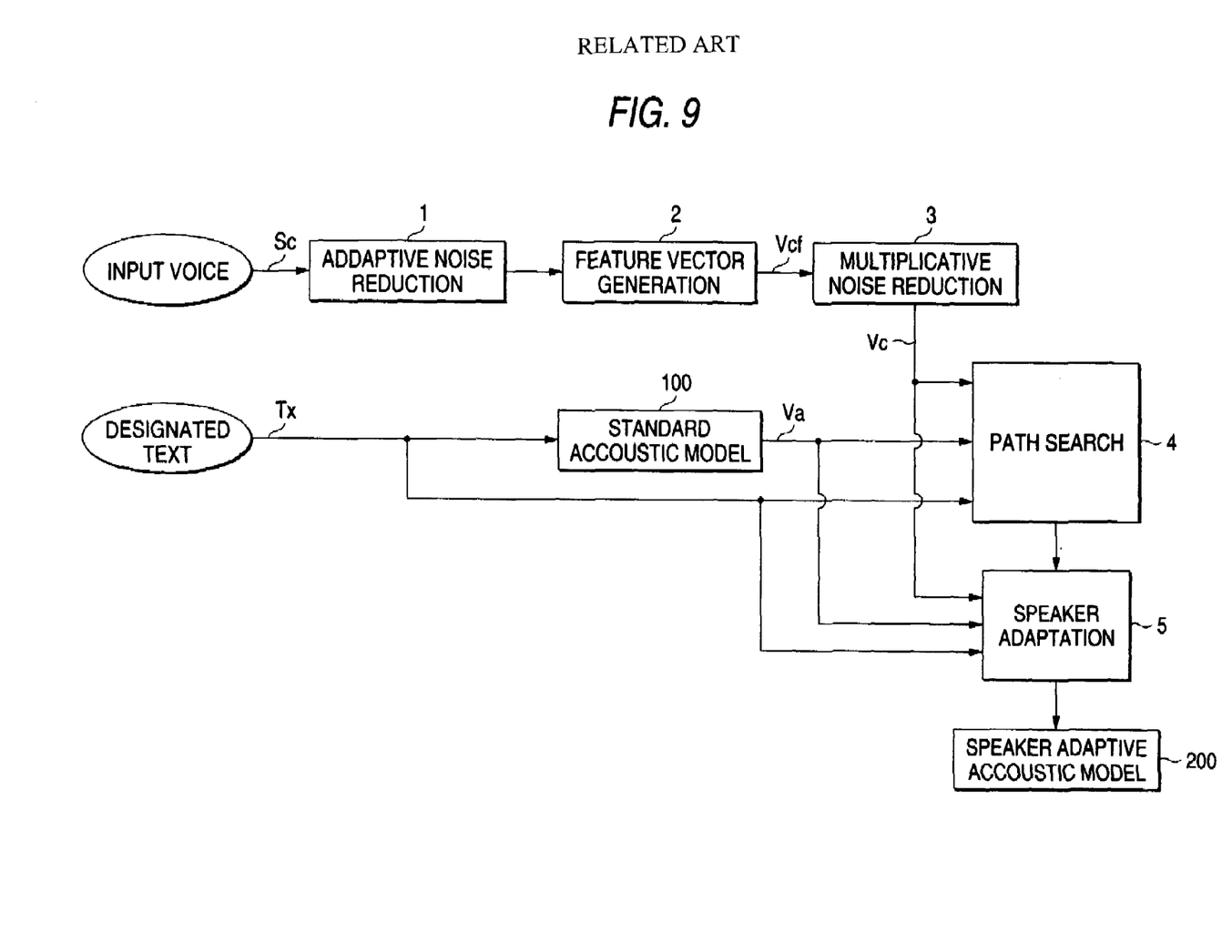
FIG. 9 is a block diagram showing the structure of a speaker adaptation type voice recognition system in the related art.

In the related art, a system shown in FIG. 9 is well known as a speaker adaptive voice recognition system, for example.

This voice recognition system is provided with a previously prepared standard acoustic model 100 of an unspecified speaker, and a speaker adaptive acoustic model 200 is prepared by using a feature vector of an input signal Sc generated from an input voice uttered by a specified speaker, and the standard acoustic model 100, and the voice recognition is conducted by adapting the system to the voice of the specified speaker.

When the adaptive acoustic model 200 is prepared, the standard vector Va corresponding to a designated text (sentence or syllable) Tx is supplied from the standard acoustic model 100 to a path search section 4 and a speaker adaptation section 5, and further, actually, by uttering the designation text Tx by the specified speaker, the input signal Sc is inputted.

Then, after an additive noise reduction section 1 removes an additive noise included in the input signal Sc, a feature vector generation section 2 generates a feature vector series Vcf which represents the feature quantity of the input signal Sc. Further, a multiplicative noise reduction section 3 removes a multiplicative noise from the feature vector series Vcf, and generates the feature vector series Vc from which the additive noise and the multiplicative noise are removed. The feature vector series Vc is supplied to a path search section 4 and a speaker adaptation section 5.

In this manner, when the standard vector Va and the feature vector series Vc of the input signal Sc actually uttered are supplied to the path search section 4 and the speaker adaptation section 5, the path search section 4 compares the feature vector series Vc to the standard vector Va. Then, the appearance probability of the feature vector series Vc for each syllable, and the state transition probability from an syllable to another syllable are found. Thereafter, when the speaker adaptation section 5 compensates for the standard vector Va according to the appearance probability and the state transition probability, the speaker adaptive acoustic model 200 adaptive to the feature of the voice (input signal) proper to the specified speaker is prepared.

Then, the speaker adaptive acoustic model 200 is adapted to the input signal generated from the uttered voice by the specified speaker. Thereafter, when the specified speaker utters arbitrarily, the feature vector of the input singal generated from the uttered voice is collated with the adaptive vector of the speaker adaptive acoustic model 200, and the voice recognition is conducted in such a manner that the speaker adaptive acoustic model 200 which gives the highest likelihood is made a recognition result.

In this connection, in the above conventional adaptation type voice recognition system, when the adaptive acoustic model 200 is prepared, the additive noise reduction section 1 removes the additive noise by the spectrum subtraction method, and the multiplicative noise reduction section 3 removes the mulatiplicative noise by the CMN method (cepstrum means normalization), and thereby, the speaker adaptive acoustic model 200 not influenced by the noise is prepared.

That is, the additive noise reduction section 1 removes the spectrum of the additive noise from the spectrum of the input signal Sc after the spectrum of the input signal Sc is found. The multiplicative noise reduction section 3 subtracts the time average value from the cepstrum of the input signal Sc after the time average value of the cepstrum of the input signal Sc is found.

However, also in any of the spectrum subtraction method and the CMN method, it is very difficult to remove only noise. Because there is a case where the feature information of the utterance of the speaker proper to be compensated for by the speaker adaptation is also missed, the adequate speaker adaptive acoustic model 200 cannot be prepared. Therefore, there is a problem that the voice recognition rate is degraded.

SUMMARY OF THE INVENTION

An object of the present invention is to provide a speaker adaptive type voice recognition system which is robust to the noise, to attain the increase of the voice recognition rate.

In order to attain the above object, there is provided a voice recognition system comprising:

a standard acoustic model having a standard vector generated according to information on voice;

a first feature vector generation section for reducing noise from an input signal generated from an uttered voice corresponding to a designated text to generate a first feature vector;

a second feature vector generation section for generating a second feature vector from the input signal having the noise; and a preparation section for generating an adaptive vector based on the first feature vector, the second feature vector and the standard vector, and preparing a speaker adaptive acoustic model suitable for the uttered voice.

According to the present invention, the preparation section compares the first feature vector with the standard vector to obtain a path search result; and the preparation section coordinates the second feature vector with the standard vector according to the path search result to generate the adaptive vector.

According to the present invention, the noise includes additive noise and multiplicative noise.

According to the present invention, the first feature vector generation section includes an additive noise reduction section for reducing the additive noise from the input signal to generate an additive-noise reduced signal.

According to the present invention, the additive noise reduction section applies a transformation to the input signal to generate a first spectrum and subtracting an additive noise spectrum corresponding to the additive noise from the first spectrum.

According to the present invention, the first feature vector generation section includes a cepstrum calculator for applying cepstrum calculation to the additive-noise reduced signal.

According to the present invention, the first feature vector generation section includes a multiplicative noise reduction section for reducing the multiplicative noise by subtracting the multiplicative noise from the first feature vector.

According to the present invention, the first feature vector contains a plurality of time-series first feature vectors; and the multiplicative noise reduction section calculates a time average of the time-series first feature vectors for estimating the multiplicative noise.

According to the present invention, the second feature vector generation section applies at least cepstrum calculation to the second spectrum to generate the second feature vector.

According to such the structure, in the case of speaker adaptation, the first feature vector generation section generates the first feature vector except for the additive noise of the peripheral circumstance surrounding the speaker or the multiplicative noise such as transmission noise of the present voice recognition system itself. The second feature vector generation section generates the second feature vector including the additive noise of the peripheral circumstance surrounding the speaker or the feature of the multiplicative noise such as transmission noise of the present voice recognition system itself. Then, the preparation section generates the adaptive vector by compensating the standard vector according to the first feature vector not including the noise and the second feature vector including the noise. Therefore the adoptive vector generates the updated speaker adaptive acoustic model which is adaptive to the voice of the speaker.

As described above, according to the feature vector not including the noise and the feature vector including the noise, the standard vector in the standard acoustic model is compensated for. Therefore, the speaker adaptive acoustic model corresponding to the practical utterance circumstance can be prepared, and the voice recognition system being robust to the noise and having the higher voice recognition rate can be realized.

Further, the second feature vector generation section generates the feature vector without removing the additive noise or multicative noise and the feature vector is used for the speaker adaptation. Therefore, the feature information of the original voice is not removed, and the adequate speaker adaptive acoustic model can be generated.

BRIEF DESCRIPTION OF THE DRAWINGS

FIG. 4 is a table showing feature vector series $[c_{i, M}]$ outputted from a multiplicative noise reduction section 9 at the time of speaker adaptation.

DETAILED DESCRIPTION OF THE PRESENT INVENTION

Referring to the drawings, the present invention will be described below with reference to the accompanying drawings. In this connection, FIG. 1 is a block diagram showing the structure of a voice recognition system according to an embodiment of the present invention.

Figure 1:
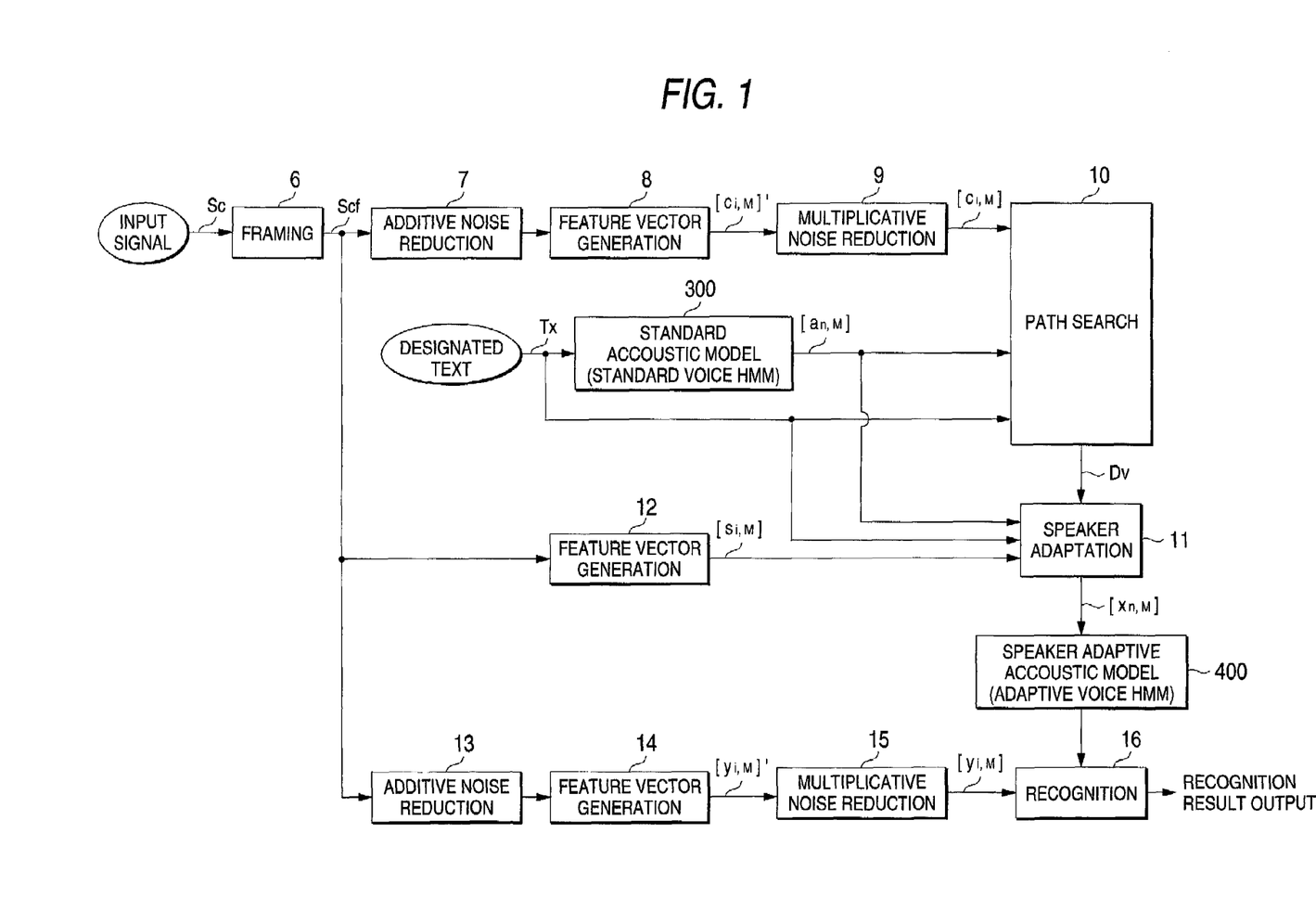
FIG. 1 is a block diagram showing the structure of a voice recognition system of an embodiment of the present invention.

In FIG. 1, the voice recognition system comprises the standard acoustic model (hereinafter, referred to as [standard voice HMM]) 300 of an unspecified speaker previously prepared by using the Hidden Markov model (HMM) and the speaker adaptation acoustic model (hereinafter, referred to as [adaptive voice HMM]) 400 prepared by the speaker adaptation.

In this connection, to easily understand the embodiment of the present invention, the state number of the standard voice HMM 300 is defined as 1. Further, the standard voice HMM 300 has an appearance probability distribution for each syllable, and an average vector of the appearance probability distribution is to be a standard vector.

Figure 2:
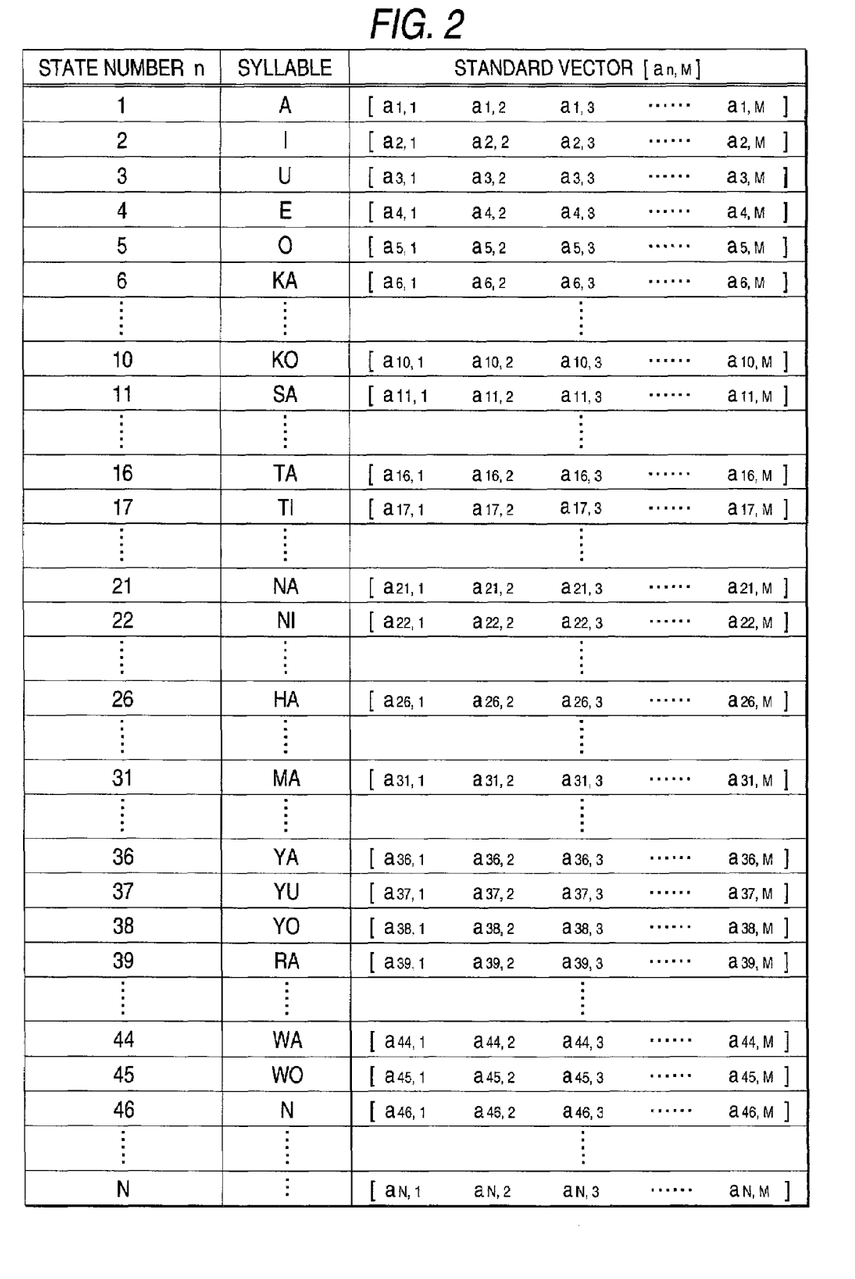
FIG. 2 is a table typically showing the structure of a standard acoustic model.

Accordingly, as typically shown in FIG. 2, the standard voice HMM 300 has a M dimensional standard vector $[a_{n, M}]$ for each syllable. That is, when the standard voice HMM 300 is prepared, for example, voice data generated from an uttered voice by one or plurality of speakers (unspecified speakers) under silent environment is framed for each predetermine time. The framed voice data is successively cepstrum-operated, to generate the feature vector series in the cepstrum domain for a plurality of frames for each syllable. Obtaining the average of the feature vector series for a plurality of frames prepares the standard voice HMM 300 composed of the standard vector $[a_{n, M}]$ for each syllable.

Herein, a variable n of the standard vector $[a_{n, M}]$ expresses the state number to recognize each syllable, and a variable M expresses the dimension of the vector. For example, the Japanese syllable [A] corresponding to the state number n=1 is characterized as the M dimensional standard vector $[a_{n, M}] = [a_{1, 1}, a_{1, 2}, a_{1, 3}, \ldots a_{1, M}]$, and the Japanese syllable [I] corresponding to the state number n=2 is characterized as the M dimensional standard vector $[a_{n, M}] = [a_{2, 1}, a_{2, 2}, a_{2, 3}, \ldots a_{2, M}]$. The same rule applies correspondingly to the following, and the remaining syllables are also characterized as the M dimensional standard vector $[a_{n, M}]$ distinguished by the state number n.

At the time of the speaker adaptation which will be described later, the standard voice HMM 300 is supplied with the designated text Tx of the previously determined sentence or syllable, and the standard vector $[a_{n, M}]$ corresponding to the syllable structuring the designated text Tx is supplied to the path search section 10 and the speaker adaptation section 11, according to the arrangement sequence of the syllable.

For example, when the designated text Tx of Japanese [KONNICHIWA] is supplied, the standard vectors corresponding to respective state numbers n=10, 46, 22, 17, 44 expressing [KO], [N], [NI], [CHI], [WA], $[a_{10, 1}, a_{10, 2}, a_{10, 3}, \ldots a_{10, M}]$, $[a_{46, 1}, a_{46, 2}, a_{46, 3}, \ldots a_{46, M}]$, $[a_{22, 1}, a_{22, 2}, a_{22, 3}, \ldots a_{22, M}]$, $[a17, 1, a_{17, 2}, a_{17, 3}, \ldots a_{17, M}]$, and $[a_{44, 1}, a_{44, 2}, \ldots a_{44}, M]$ are supplied to the path search section 10 and the speaker adaptation section 11 in order.

Further, the voice recognition system of the present invention is provided with a framing section 6, additive noise reduction section 7, feature vector generation section 8, multiplicative noise reduction section 9, and feature vector generation section 12.

The framing section 6, when the specified speaker actually utters the designated text Tx at the time of the speaker adaptation, divides an input signal Sc into generated from the uttered voice frames for each predetermined time (for example, 10–20 msec) and outputs it to the additive noise reduction sections 7, 13 and feature vector generation section 12.

The additive noise reduction section 7 successively conducts Fourier transformation on each framed input signal Scf divided into each frame to generate a spectrum for each frame. Further, the additive noise included in each spectrum is removed in the spectrum domain to output the spectrum.

The feature vector generation section 8 conducts the cepstrum operation on the spectrum having no additive noise for each frame to generate the feature vector series $[c_{i,M}]'$ in the cepstrum domain. In this connection, the variable i of the feature vector series $[c_{i,M}]'$ expresses the order (number), and the variable M expresses the dimension.

The multiplicative noise reduction section 9 removes the multiplicative noise from the feature vector series $[C_{i,m}]'$ by using the CMN method. That is, a plurality of the feature vector series $[C_{i,m}]'$ obtained for each frame i by the feature vector generation section 8 are time-averaged for each dimension. When the M dimensional time average value $[C\hat{}_m]$ obtained thereby is subtracted from each feature vector $[C_{i,m}]'$ to generate the feature vector series $[C_{i,m}]$ from which the multiplicative noise is removed. The feature vector series $[C_{i,m}]$ thus generated is supplied to the path search section 10.

The feature vector generation section 12 generates spectrum for the frame when each framed input signal Scf divided for frame outputted from the framing section 6 is successively Fourier-transformed. Further, when each spectrum is cepstrum-operated for each frame, the feature vector series $[S_{i,M}]$ in the cepstrum domain is generated and supplied to the speaker adaptation section 11. In this connection, the variable i of the feature vector series $[s_{i,M}]$ expresses the order for each frame, and the variable M expresses the dimension.

In this manner, the designation text Tx, standard vector $[a_{n,M}]$ and feature vector series $[c_{i,M}]$ are supplied to the path search section 10. The designation text Tx, standard vector $[a_{n,M}]$ and feature vector series $[s_{i,M}]$ are supplied to the speaker adaptation section 11.

The path search section 10 compares the standard vector $[a_{n,M}]$ to the feature vector series $[c_{i,M}]$, and judges which syllable of the designation text Tx corresponds to the feature vector series $[c_{i,M}]$ for each frame. The path search result Dv is supplied to the speaker adaptation section 11.

The speaker adaptation section 11 divides the feature vector series $[s_{i,M}]$ from the feature vector generation section 12 into each syllable according to the path search result Dv. Then, the average is obtained for each dimension with respect to the feature vector series $[s_{i,M}]$ for each divided syllable. Eventually, the average feature vector $[s\hat{}_{n,M}]$ for each syllable is generated.

Further, the speaker adaptation section 11 finds a difference vector $[d_{n,M}]$ between the standard vector $[a_{n,M}]$ of each syllable corresponding to the designation text Tx, and the average feature vector $[s\hat{}_{n,M}]$. Then, conducting the average operation on these difference vectors $[d_{n,M}]$ leads to finding the M dimensional movement vector $[m_M]$ expressing the feature of the specified speaker. Further, the adaptation vectors $[x_{n,M}]$ for all syllables are generated by adding the movement vector $[m_M]$ to the standard vectors $[a_{n,M}]$ of all syllables from the standard voice HMM 300. The adaptive voice HMM 400 is updated by these adaptation vectors $[x_{n,M}]$.

Next, referring to FIG. 2–FIG. 8, the function of the path search section 10 and the speaker adaptation section 11 will be described in detail.

In this connection, the designation text Tx of Japanese [KONNICHIWA] is used as a typical example.

Further, it is defined that the input signal Sc of Japanese [KONNICHIWA] uttered by the speaker is divided into 30 frames by the framing section 6 and inputted.

The standard voice HMM 300 is, as shown in FIG. 2, prepared as the standard vector $[a_{n,M}]$ the unspecified speaker corresponding to each of a plurality of syllables. Further, each syllable is classified by the state number n.

Further, the adaptive voice HMM 400 is set to the same content (default setting) as the standard vector $[a_{n,M}]$ of the standard voice HMM 300 before the speaker adaptation, as shown in FIG. 2.

At the beginning of the speaker adaptation processing, the designation text Tx of Japanese [KONNICHIWA] is supplied to the standard voice HMM 300. Then, supplied to the path search section 10 and the speaker adaptation section 11 are the standard vector $[a_{10,1}, a_{10,2}, a_{10,3}, \ldots a_{10,M}]$ corresponding to the state number n=10 expressing the syllable [KO], the standard vector $[a_{46,1}, a_{46,2}, a_{46,3}, \ldots a_{46,M}]$ corresponding to the state number n=46 expressing the syllable [N], the standard vector $[a_{22,1}, a_{22,2}, a_{22,3}, \ldots a_{22,M}]$ corresponding to the state number n=22 expressing the syllable [NI], the standard vector $[a_{17,1}, a_{17,2}, a_{17,3}, \ldots a_{17,M}]$ corresponding to the state number n=17 expressing the syllable [CHI], and the standard vector $[a_{44,1}, a_{44,2}, a_{44,3}, \ldots a_{44,M}]$ corresponding to the state number n=44 expressing the syllable [WA].

Next, when the speaker utters [KONNICHIWA], the framing section 6 divides the input signal Sc into 30 frames according to the lapse of time, and outputs the divided input signal Sc. Then, the feature vector generation section 12 generates the feature vectors $[s_{1,1}, s_{1,2}, s_{1,3}, \ldots s_{1,M}]$–$[s_{30,1}, s_{30,2}, s_{30,3}, \ldots s_{30,m}]$ of the framed input signal Scf according to the order of each frame, and supplies to the speaker adaptation section 11.

Figure 3:
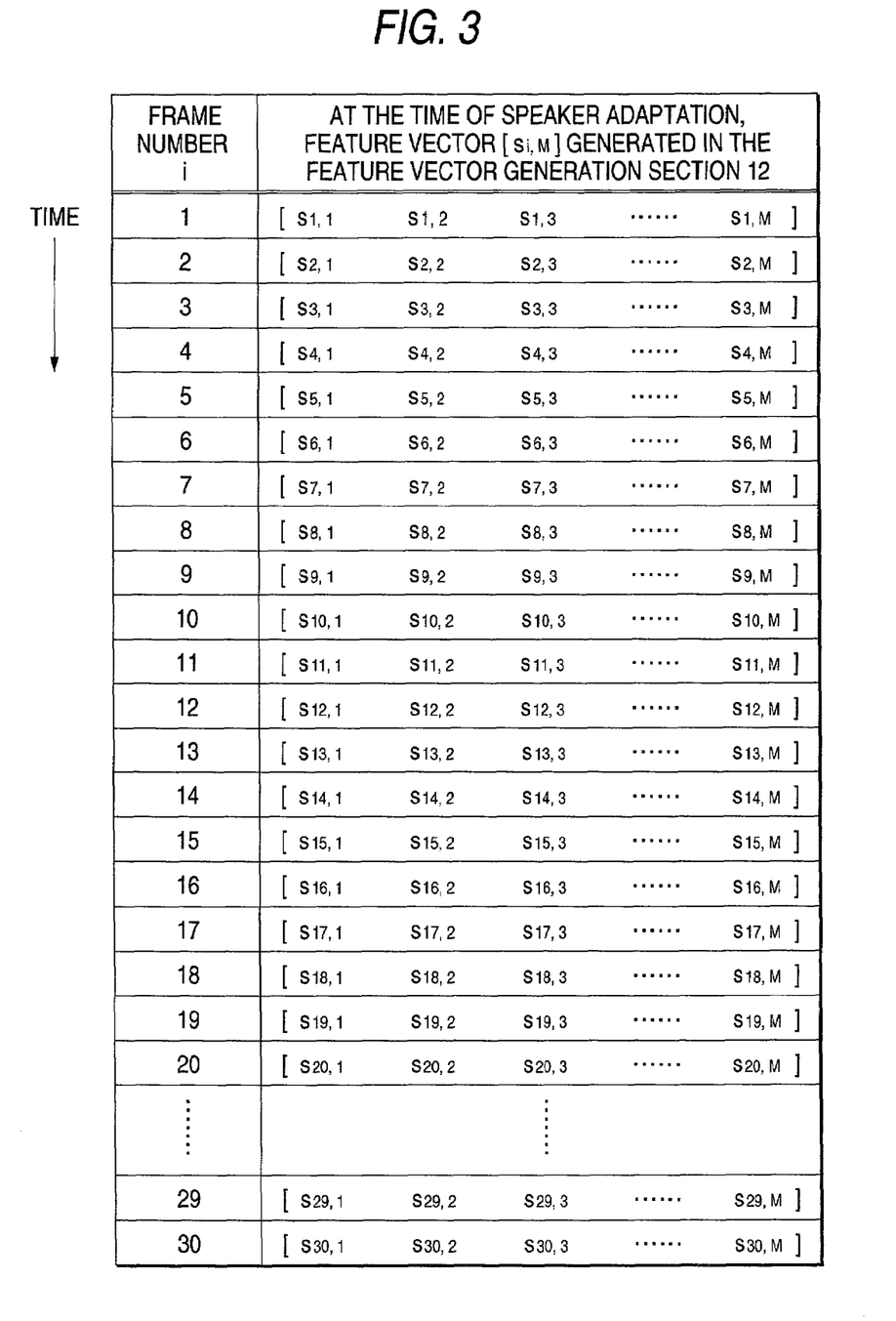
FIG. 3 is a table showing feature vector series $[S_{i, M}]$ generated in a feature vector generation section 12 at the time of speaker adaptation.

That is, as typically shown in FIG. 3, the feature vector generation section 12 generates the feature vector series for 30 frames of i=1–30, $[s_{i,M}]$, and supplies to the speaker =$[s_{1,2}, s_{1,3}, \ldots s_{1,M}]$–$[s_{30,1}, s_{30,3}, \ldots s_{30,M}]$2adaptation section 11.

On the one hand, the processing system includes the additive noise reduction section 7, feature vector generation section 8, and multiplicative noise reduction section 9. In the processing system, the feature vector series $[c_{i,M}]=[C_{1,1}, C_{1,2}, C_{1,3}, \ldots c_{1,M}]$–$[c_{30,1}, c_{30,2}, c_{30,3}, \ldots c_{30,M}]$ for 30 frames of i =1–30 are generated according to the framed input signal Scf of each frame supplied from the framing section 6, and supplied to the path search section 10. That is, as typically shown in FIG. 4, the feature vector series for 30 frames $[c_{i,M}]=[c_{1,1}, c_{1,2}, c_{1,3}, \ldots c_{1,M}]$– $[c_{30,1}, c_{30,2}, c_{30,3}, \ldots C_{30}, M]$ are supplied to the path search section 10 through the multiplicative noise reduction section 9.

The path search section 10 compares the feature vector series $[c_{i,M}]$ for 30 frames to the standard vector $[a_{n,M}]$ corresponding to each syllable of the designation text Tx, by the methods of Viterbi algorithm or forward backward algorithm, and finds which syllable corresponds to the feature vector series $[C_{i,M}]$ at each moment for each frame.

Figure 5:
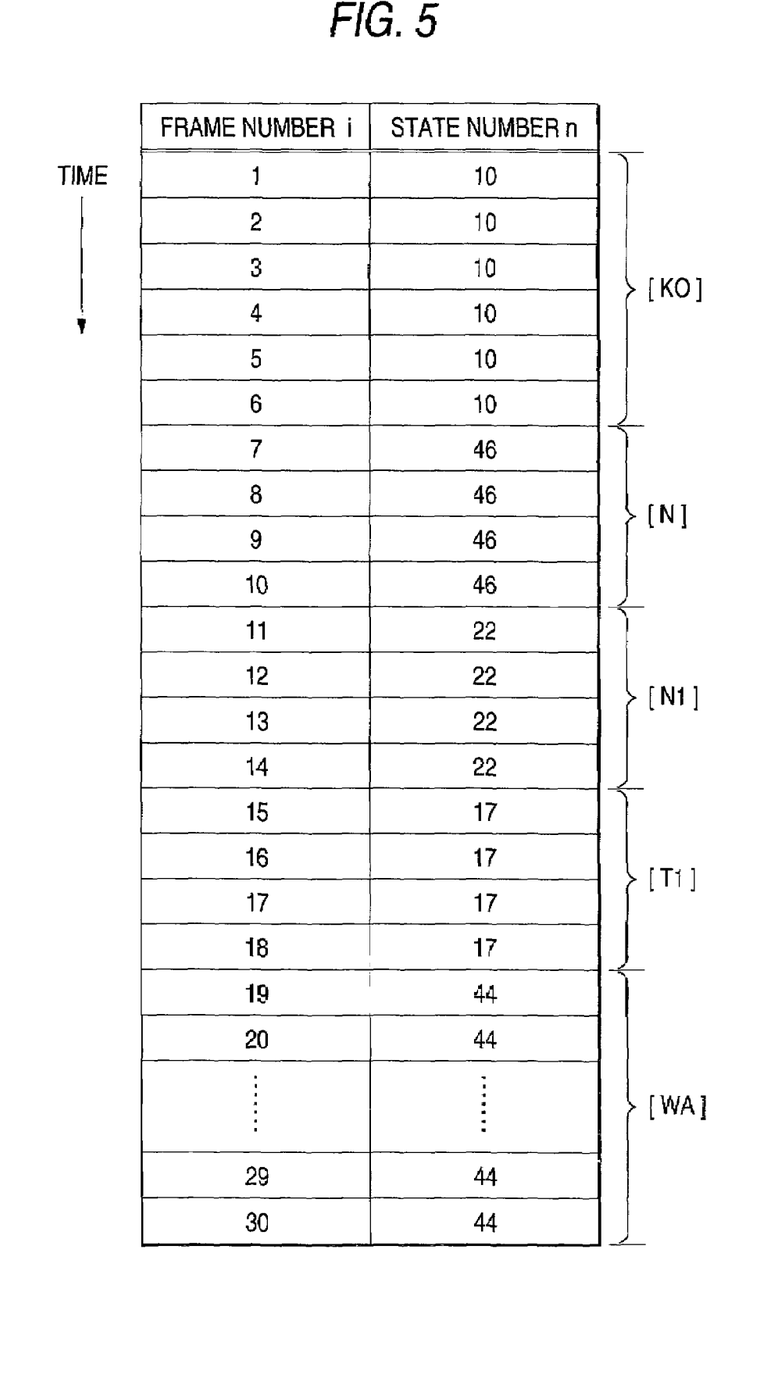
FIG. 5 is a table showing the corresponding relationship of the feature vector series $[c_{i, M}]$ with a standard vector $[a_{n, M}]$ according to the frame number and the state number.

Thereby, as shown in FIG. 5, each frame number i of 30 frames is coordinated to each state number n expressing each syllable of [KONNICHIWA]. Then, the coordinated result is supplied to the speaker adaptation section 11 as the path search result Dv.

The speaker adaptation section 11 coordinates the feature vectors $[s_{1,1}, s_{1,2}, s_{1,3}, \ldots s_{1,M}]$–$[s_{30,1}, s_{30,2}, s_{30,3}, \ldots s_{30,M}]$ to the standard vectors $(a_{10,1}, a_{10,2}, a_{10,3}, \ldots a_{10,M}]$, $[a_{46,1}, a_{46,2}, a_{46,3}, \ldots a_{46,M}]$, $[a_{22,1}, a_{22,2}, a_{22,3}, \ldots a_{22,M}]$, $[a_{17,1}, a_{17,2}, a_{17,3}, \ldots a_{17,M}]$, $[a_{44,1}, a_{44,2}, a_{44,3}, \ldots a_{44,M}]$, according to the path search result Dv.

Figure 6:
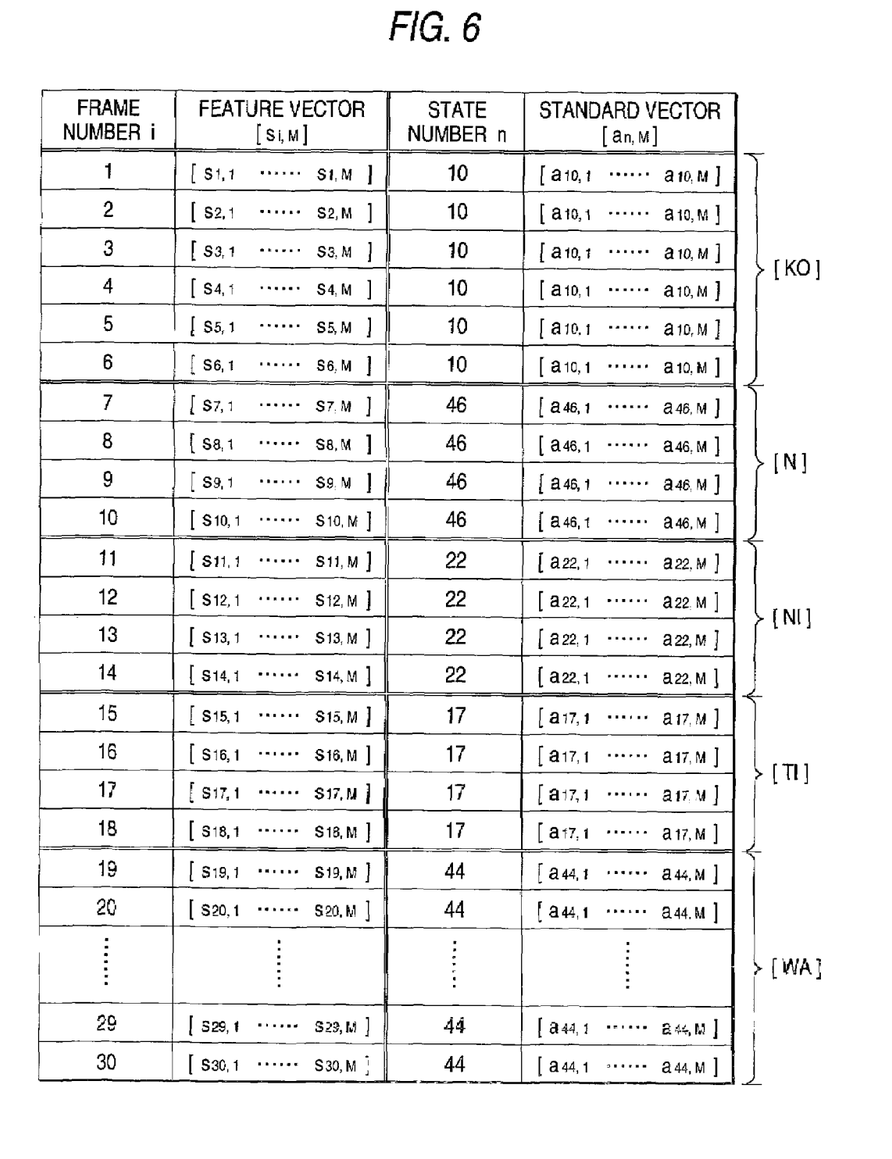
FIG. 6 is a table showing the relationship of the feature vector series $[c_{i, M}]$, the standard vector $[a_{n, M}]$, the frame number and the state number.

That is, as shown in FIG. 6, the standard vector $[a_{10,1}, a_{10,2}, a_{10,3}, \ldots a_{10,M}]$ is coordinated to the feature vector $[s_{1,1}, s_{1,2}, s_{1,3}, \ldots s_{1,M}]$–$[s_{6,1}, s_{6,2}, s_{6,3}, \ldots s_{6,M}]$ of the frame number i=1–6 corresponding to the syllable [KO] obtained by the path search. The standard vector $[a_{46,1}, a_{46,2}, a_{46,3}, \ldots a_{46,M}]$ is coordinated to the feature vector $[s_{7,1}, s_{7,2}, s_{7,3}, \ldots s_{7,M}]$–$[s_{10,1}, s_{10,2}, s_{10,3}, \ldots s_{10,M}]$ of the frame number i=7–10 corresponding to the syllable [N].

Further, the standard vector $[a_{22,1}, a_{22,2}, a_{22,3}, \ldots a_{22,M}]$ is coordinated to the feature vector $[s_{11,1}, s_{11,2}, s_{11,3}, \ldots s_{11,M}]$–$[s_{14,1}, s_{14,2}, s_{14,3}, \ldots s_{14,M}]$ of the frame number i=11–14 corresponding to the syllable [NI]. The standard vector $[a_{17,1}, a_{17,2}, a_{17,3}, \ldots a_{17,M}]$ is coordinated to the feature vector $[s_{15,1}, s_{15,2}, s_{15,3}, \ldots s_{15,M}]$–$[s_{18,1}, s_{18,2}, s_{18,3}, \ldots s_{18,M}]$ of the frame number i=15–18 corresponding to the syllable [CHI]. The standard vector $[a_{44,1}, a_{44,2}, a_{44,3}, \ldots a_{44,M}]$ is coordinated to the feature vector $[s_{19,1}, s_{19,2}, s_{19,3}, \ldots s_{19,M}]$–$[s_{30,1}, s_{30,2}, s_{30,3}, \ldots s_{30,M}]$ of the frame number i=19–30 corresponding to the syllable [WA].

Figure 7:
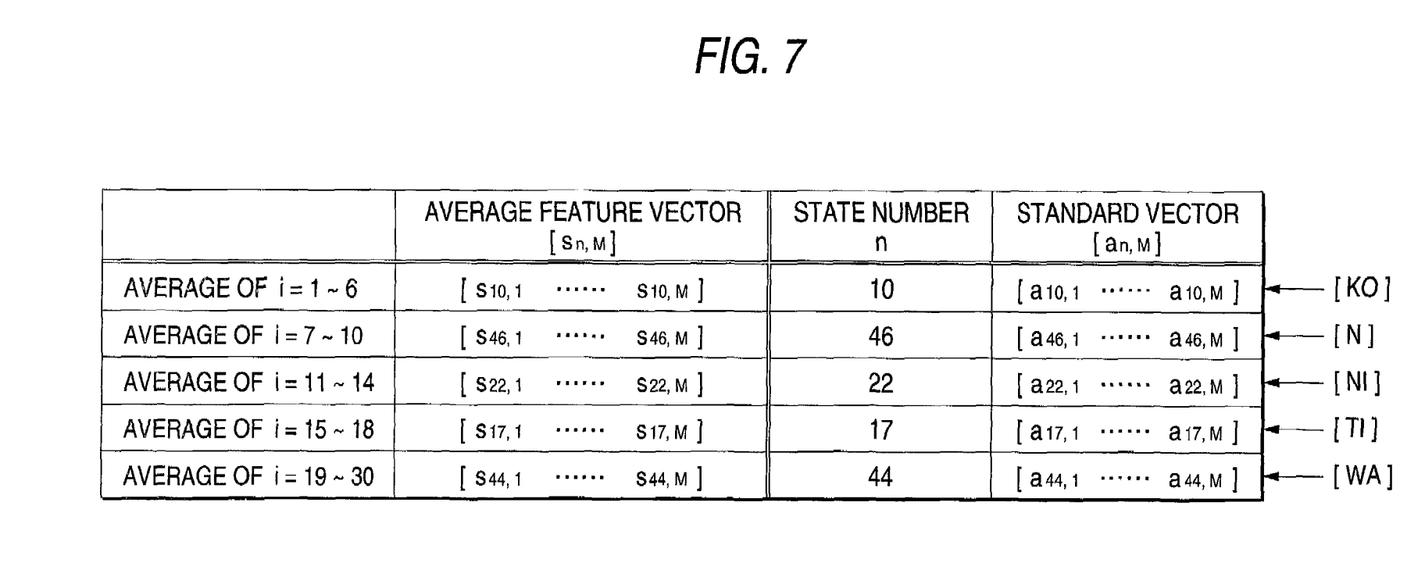
FIG. 7 is a table showing the relationship of the average feature vector generated by the speaker adaptation with the standard vector.

Next, the speaker adaptation section 11 divides the feature vectors $[s_{1,1}, s_{1,2}, s_{1,3}, \ldots s_{1,M}]$–$[s_{30,1}, s_{30,2}, s_{30,3}, \ldots s_{30,M}]$ for 30 frames shown in FIG. 6, for each syllable of [KO], [N], [NI], [CHI], [WA]. As shown in FIG. 7, the average feature vector for each syllable of [KO], [N], [NI], [CHI], [WA], $[\hat{s}_{n,M}]$ is generated by obtaining the average for each divided feature vector.

That is, relating to the feature vectors $[s_{1,1}, s_{1,2}, s_{1,3}, \ldots s_{1,M}]$–$[s_{6,1}, s_{6,2}, s_{6,3}, \ldots s_{6,M}]$ of the first sixth frames (frame number k=6) corresponding to the syllable [KO] shown in FIG. 6, as shown by the following expression (1), the first dimensional 6 elements $s_{1,1}$–$s_{6,1}$ are added, and the first dimensional element $\hat{s}_{n,1}$ of the average feature vector $[\hat{s}_{n,M}]$ is obtained by multiplying the added value $(s_{1,1}+s_{2,1}+s_{3,1}+s_{4,1}+s_{5,1}+s_{6,1})$ by frame number k=6. Further, in the same manner as to the second dimensional 6 elements $s_{1,2}$–$s_{6,2}$, the added value $(s_{1,2}+s_{2,2}+s_{3,2}+s_{4,2}+s_{5,2}+s_{6,2})$ is obtained. Then, the second dimensional element $\hat{s}_{n,2}$ of the average feature vector $[\hat{s}_{n,M}]$ is obtained by multiplying it by frame number k=6. In the same manner as also in the following, the element $\hat{s}_{n,M}$ up to the M dimensional 6 element $s_{1,M}$–$s_{6,M}$ is obtained, and the M dimensional average feature vector $[\hat{s}_{n,1}, \hat{s}_{n,2}, \hat{s}_{n,3}, \ldots \hat{s}_{n,M}]$ corresponding to the syllable [KO] composed of these M dimensional elements $\hat{s}_{n,1}$–$\hat{s}_{n,M}$ is generated.

$$\hat{s}_{n,M}=(s_{1,1}+s_{2,1}+s_{3,1}+s_{4,1}+s_{5,1}+s_{6,1})/k \quad (1)$$

where the variable K in the expression (1) is the frame number in each syllable;

the variable n is the state number to distinguish each syllable; and the variable M expresses the dimension.

Accordingly, the variable n in the expression (1) is n=10, and the M dimensional average feature vector corresponding to the syllable [KO] is $[\hat{s}_{10,1}, \hat{s}_{10,2}, \hat{s}_{10,3}, \ldots \hat{s}_{10,M}]$.

Further, the average feature vector $[\hat{s}_{46,1}, \ldots \hat{s}_{46,M}]$ corresponding to the remaining syllable [N], the average feature vector $[\hat{s}_{22,1}, \ldots \hat{s}_{22,M}]$ corresponding to the syllable [NI], the average feature vector $[\hat{s}_{17,1}, \ldots \hat{s}_{17,M}]$ corresponding to the syllable [CHI], and the average feature vector $[\hat{s}_{44,1}, \ldots \hat{s}_{44,M}]$ corresponding to the syllable [WA], are also obtained in the same manner.

Next, according to the next expression (2), the difference vector $[d_{10,1}, \ldots d_{10,M}]$, $[d_{46,1}, \ldots d_{46,M}]$, $[d_{22,1}, \ldots d_{22,M}]$, $[d_{17,1}, \ldots d_{17,M}]$, and $[d_{44,1}, \ldots d_{44,M}]$ between the average feature vector $[\hat{s}_{10,1}, \ldots \hat{s}_{10,M}]$, $[\hat{s}_{46,1}, \ldots \hat{s}_{46,M}]$, $[\hat{s}_{22,1}, \ldots \hat{s}_{17,M}]$, $[\hat{s}_{44,1}, \ldots \hat{s}_{44,M}]$ corresponding to each of syllables [KO], [N], [NI], [CHI], and [WA], and the standard vector $[a_{10,1}, \ldots a_{10,M}]$, $[a_{46,1}, \ldots a_{46,M}]$, $[a_{22,1}, \ldots a_{22,M}]$, $[a_{17,1}, \ldots a_{17,M}]$, and $[a_{44,1}, \ldots a_{44,M}]$, are respectively obtained.

$$d_{n,j}=\hat{s}_{n,j}-a_{n,j} \quad (2)$$

where the variable n in the expression (2) shows the state numbers n=10, 46, 22, 17, 44, corresponding to each of syllables [KO], [N], [NI], [CHI], [WA]; and the variable j shows each of dimensions j=1-M of the vector.

Then, the obtained difference vectors $[d_{10,1}, \ldots d_{10,M}]$, $[d_{46,1}, \ldots d_{46,M}]$, $[d_{22,1}, \ldots d_{22,M}]$, $[d_{17,1}, \ldots d_{17,M}]$, and $[d_{14,1}, \ldots d_{44,M}]$ are applied to the next expression (3). The M dimensional movement vector $[m_M]=[m_1, m_2, \ldots, m_M]$ of these 5 (V=5) syllables of [KO], [N], [NI], [CHI], [WA] is obtained from the average for each dimension.

$$m_j = \frac{1}{V}\sum_n d_{n,j} \quad (3)$$

where the variable j in the expression (3) shows each dimension j=1-M of the vector;

the variable n shows the state numbers n=10, 46, 22, 17, 44 corresponding to each of syllables [KO], [N], [NI], [CHI], [WA]; and the variable V shows the number of syllables (V=5).

Figure 8:
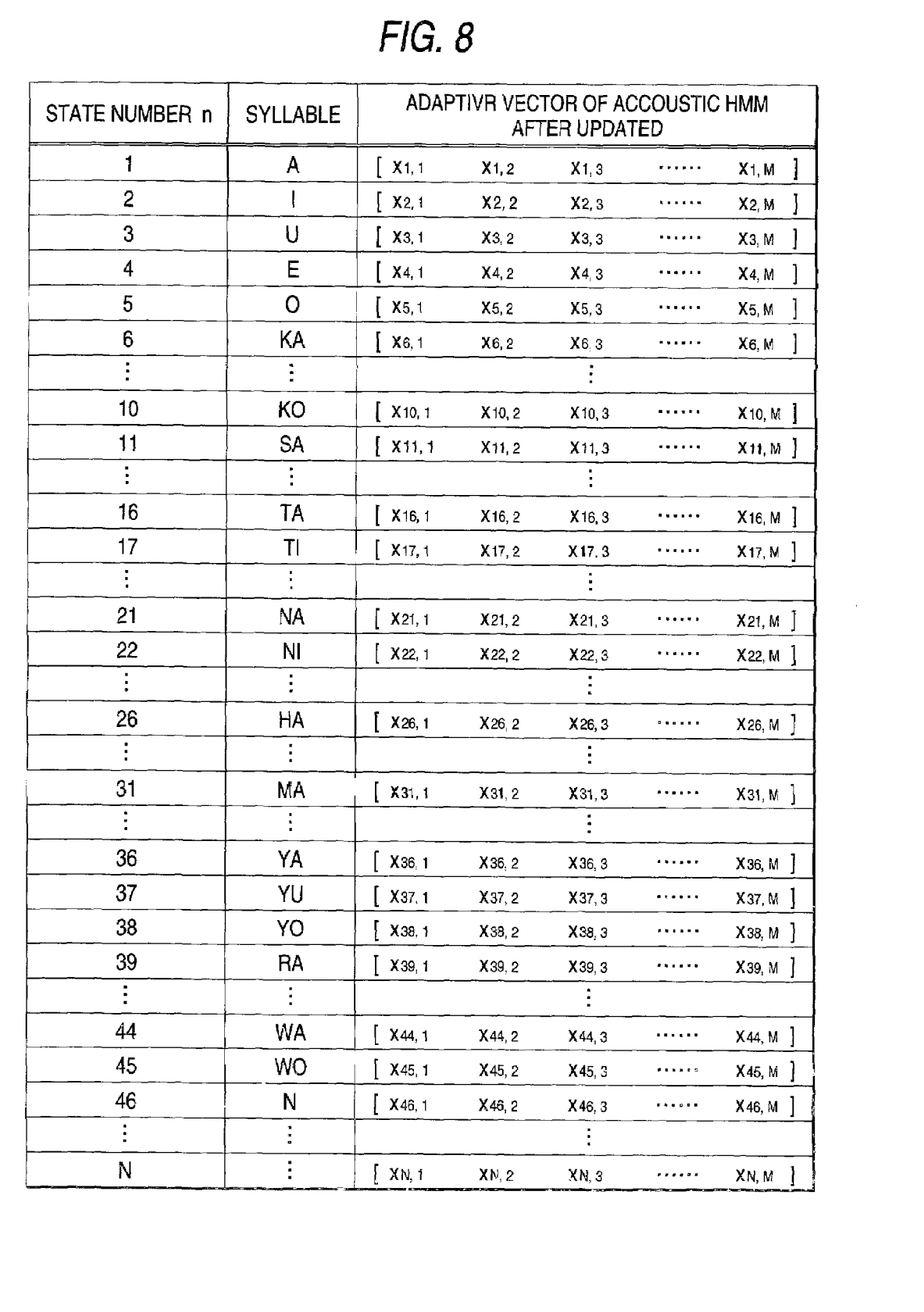
FIG. 8 is a table showing the content of the speaker adaptive acoustic model after update.

Thus obtained movement vector $[m_M]=[m_1, m_2, \ldots, m_M]$ expresses the feature of the specified speaker. Then, as shown by the next operational expression (4), the adaptive vector $[x_{n,M}]$ having the feature proper to the speaker is obtained from addition of the movement vector $[m_M]$ to the standard vector $[a_{n,M}]$ of the all syllables. Further, as shown in FIG. 8, the processing of the speaker adaptation is completed by updating the adaptive voice HMM 400 by the obtained adaptive vector $[x_{n,M}]$.

$$[x_{n,M}]=[a_{n,M}]+[(m_M)] \quad (4)$$

It is described hereinabove that the adaptive voice HMM 400 has the speaker adaptation according to the designation text Tx of [KONNICHIWA]. However, when the adaptive voice HMM 400 has the speaker adaptation according to the designation text Tx including other syllables, all the syllable in the adaptive voice HMM 400 can also have the speaker adaptation.

Next, after the speaker adaptation generates the adaptive voice HMM 400, when the specified speaker conducts an arbitrary utterance, the framing section 6 divides the input signal Sc into the frames for each predetermined time (for example, 10–20 msec) in the same manner as the above. Then, the framing section 6 outputs the framed input signal Scf of each frame according to the lapse of time, and supplies to the additive noise reduction section 13.

The additive noise reduction section 13, in the same manner as the above additive noise reduction section 7, conducts Fourier transformation on each framed input signal Scf divided for frame, and generates the spectrum for each frame. Further, the additive noise reduction section 13 removes the additive noise included in each spectrum in the spectrum domain, and outputs the spectrum to the feature vector generation section 14.

The feature vector generation section 14, in the same manner as in the above feature vector generation section 8, conducts the cepstrum operation on the spectrum having no additive noise for frame, generates the feature vector series $[y_{i, M}]'$ in the cepstrum domain, and outputs to the multiplicative noise reduction section 15.

The multiplicative noise reduction section 15, in the same manner as in the above multiplicative noise reduction section 9, removes the multiplicative noise from the feature vector series $[y_{i, M}]'$ by using the CMN method, and supplies the M dimensional feature vector series $[Y_{i, M}]$ having no multiplicative noise, to the recognition section 16. Here, the variable i of the feature vector series $[y_{i, M}]$ expresses the frame number.

As described above, when the feature vector series $[y_{i, M}]$ based on the input signal generated from the actually uttered voice is supplied to the recognition section 16, the recognition section 16 collates the feature vector series $[y_{i, M}]$ with the adaptive vector $[x_{n, M}]$ of the adaptive voice HMM 400 in which the speaker adaptation is conducted, and outputs the adaptive voice HMM 400 which gives the highest likelihood as the recognition result.

As described above, according to the voice recognition system of the present invention, when the specified speaker utters the designation text Tx upon speaker adaptation, the additive noise reduction section 7, feature vector generation section 8 and multiplicative noise reduction section 9 generate the feature vector series $[c_{i, M}]$ from which the additive noise and multipicative noise are removed. The feature vector generation section 12 generates the feature vector series $[s_{i, M}]$ according to the framed input signal Scf including the additive noise and multipicative noise The path search section 10 and speaker adaptation section 11 generate the adaptive vector $[x_{i, M}]$ according to these feature vector series $[c_{i, M}]$, feature vector series $[s_{i, M}]$, and standard vector $[a_{i, M}]$. The adaptive vector $[x_{i, M}]$ in which the speaker adaptation is conducted updates the adaptive voice HMM 400.

Accordingly, the feature vector series $[s_{i, M}]$ including the feature of the noise (additive noise) of the peripheral circumstance surrounding the specified speaker, or transmission noise (multiplicative noise) of the present voice recognition system itself, is used for the speaker adaptation. Therefore, the adaptive voice HMM 400 corresponding to the actual utterance circumstance can be generated from the voice recognition system which is robust to the noise and whose voice recognition rate is high.

Further, in the speaker adaptation type voice recognition system in the related art, at the time of the speaker adaptation, the generation of the feature vector from which the additive noise and multiplicative noise are removed misses the feature information of the utterance proper to the speaker to be compensated for by the speaker adaptation. There is a problem that the adequate speaker adaptive acoustic model cannot be prepared.

On the other hand, according to the voice recognition system of the present invention, the feature vector generation section 12 generates the feature vector series $[s_{i, M}]$ without removing the additive noise and multiplicative noise. The feature information of the utterance proper to the speaker to be compensated for by the speaker adaptation is not missed because the feature vector series $[s_{i, M}]$ is used for the speaker adaptation. Therefore, the adequate speaker adaptive acoustic model can be prepared to increase the voice recognition rate.

In this connection, in the present invention, it is described that the adaptive voice HMM 400 on the basis of the syllables such as Japanese [AIUEO] is prepared. However, it is not limited to only the syllable, but, the adaptive voice HMM 400 based on the phoneme can be prepared.

Further, in the present invention, a simple example is taken as an example, and the method of the speaker adaptation is described. However, the speaker adaptation method of the present invention can be adapted for other various speaker adaptation methods in which the standard vector $[a_{n, M}]$ is coordinated with the feature vector series $[s_{i, M}]$ or $[c_{i, M}]$ of the speaker adaptation. According thereto, the speaker adaptive acoustic model can be generated.

As described above, according to the voice recognition system of the present invention, when the speaker adaptation is conducted, the feature vector from which the additive noise or the multiplicative noise is removed, and the feature vector including the feature of the additive noise or then multiplicative noise are generated. According to the feature vector not including noise and the feature vector including the noise, the standard vector is compensated for. Because the speaker adaptive acoustic model adaptive for the utterance proper to the speaker is prepared, the speaker adaptive acoustic model adaptive for the actual utterance circumstance can be generated.

Further, because the feature vector is used for the speaker adaptation without removing the additive noise or multiplicative noise, the feature information of the utterance proper to the speaker to be compensated for by the speaker adaptation, is not missed. Therefore, an adequate speaker adaptive acoustic model can be generated.

Therefore, a voice recognition system being robust to the noise and whose voice recognition rate is high can be obtained.

What is claimed is:

1. A speech recognition system comprising:
    a standard acoustic model having a standard vector generated according to information on speech;
    a first feature vector generation section for reducing noise from an input signal generated from uttered speech corresponding to a designated text to generate a first feature vector;
    a second feature vector generation section for generating a second feature vector from the input signal having the noise; and
    a preparation section for generating an adaptive vector based on the first feature vector, the second feature vector and the standard vector, and preparing a speaker adaptive acoustic model suitable for the uttered speech.

2. The speech recognition system according to claim 1, wherein the preparation section compares the first feature vector with the standard vector to obtain a path search result; and
    the preparation section coordinates the second feature vector with the standard vector according to the path search result to generate the adaptive vector.

3. The speech recognition system according to claim 1, wherein the noise includes additive noise and multiplicative noise.

4. The speech recognition system according to claim 3, wherein the first feature vector generation section includes an additive noise reduction section for reducing the additive noise from the input signal to generate an additive-noise reduced signal.

5. The speech recognition system according to claim 4, wherein the additive noise reduction section applies a transformation to the input signal to generate a first spectrum and subtracting an additive noise spectrum corresponding to the additive noise from the first spectrum.

6. The speech recognition system according to claim 4, wherein the first feature vector generation section includes a cepstrum calculator for applying cepstrum calculation to the additive-noise reduced signal.

7. The speech recognition system according to claim 6, wherein the first feature vector generation section includes a multiplicative noise reduction section for reducing the multiplicative noise by subtracting the multiplicative noise from the first feature vector.

8. The speech recognition system according to claim 7, wherein the first feature vector contains a plurality of time-series first feature vectors; and the multiplicative noise reduction section calculates a time average of the time-series first feature vectors for estimating the multiplicative noise.

9. The speech recognition system according to claim 1, wherein the second feature vector generation section applies at least cepstrum calculation to the input signal to generate the second feature vector.

\* \* \* \* \*